United States Patent
Imamura

(10) Patent No.: US 9,185,695 B2
(45) Date of Patent: *Nov. 10, 2015

(54) SYSTEMS AND METHODS FOR OFDMA AND SC-FDMA SWITCHING

(71) Applicant: Sharp Kabushiki Kaisha, Osaka-shi, Osaka (JP)

(72) Inventor: Kimihiko Imamura, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 177 days.

This patent is subject to a terminal disclaimer.

(21) Appl. No.: 13/946,160

(22) Filed: Jul. 19, 2013

(65) Prior Publication Data

US 2013/0301588 A1 Nov. 14, 2013

Related U.S. Application Data

(62) Division of application No. 12/189,697, filed on Aug. 11, 2008, now Pat. No. 8,509,161.

(51) Int. Cl.
*H04W 72/04* (2009.01)
*H04L 5/00* (2006.01)
*H04L 27/00* (2006.01)
*H04W 48/08* (2009.01)

(52) U.S. Cl.
CPC .......... *H04W 72/042* (2013.01); *H04L 5/0007* (2013.01); *H04L 5/0041* (2013.01); *H04L 27/0012* (2013.01); *H04W 48/08* (2013.01)

(58) Field of Classification Search
None
See application file for complete search history.

(56) References Cited

U.S. PATENT DOCUMENTS

| 7,206,332 | B2 | 4/2007 | Kwan et al. |
| 2005/0238053 | A1 | 10/2005 | Iochi et al. |
| 2007/0291635 | A1 | 12/2007 | Yang et al. |
| 2008/0095263 | A1 | 4/2008 | Xu et al. |
| 2008/0225788 | A1 | 9/2008 | Inoue et al. |
| 2009/0196366 | A1 | 8/2009 | Shen et al. |
| 2010/0014490 | A1 | 1/2010 | Kishiyama et al. |
| 2010/0091919 | A1 | 4/2010 | Xu et al. |
| 2011/0134868 | A1 | 6/2011 | Lee et al. |
| 2012/0142385 | A1 | 6/2012 | Choi et al. |

FOREIGN PATENT DOCUMENTS

| WO | 2007091235 | 8/2007 |
| WO | 2008057969 | 5/2008 |

OTHER PUBLICATIONS

REV-080026 "Proposal for LTE-advanced Technology", NTT DoCoMo, 3GPP TSG RAN 4G Work Shop, Shenzhen, China, Apr. 2008.
REV-080037 "Future 3GPP Radio Technologies for IMT-Advanced", Samsung, 3GPP TSG RAN 4G Work Shop, Shenzhen, China, Apr. 2008.
REV-080022 "NEC's proposals for LTE Advanced", NEC, 3GPP TSG RAN 4G Work Shop, Shenzhen, China, Apr. 2008.
R1-081842, "LTE-A—Requirements", Nokia and Nokia Siemens Network, RAN WG1 #53, Kansas City, MO, USA , May 2008.

(Continued)

*Primary Examiner* — Rhonda Murphy
(74) *Attorney, Agent, or Firm* — Austin Rapp & Hardman

(57) ABSTRACT

A method for selecting an uplink modulation scheme may include receiving downlink control information (DCI). The format of the DCI may be decoded. The uplink modulation scheme may be determined according to the format of the DCI. The uplink modulation scheme may be selected. An uplink signal may be transmitted according to the uplink modulation scheme.

9 Claims, 12 Drawing Sheets

(56) References Cited

OTHER PUBLICATIONS

R1-081645, "Physical-layer parameters to be configured by RRC", Ericsson, RAN WG1 #52bis, Shenzhen, China, Mar. 2008.
TS36.212 v8.2.0 section 5.3.3, Technical Specification Group Radio Access Network; Evolved Universal Terrestrial Radio Access (E-UTRA); Multiplexing and channel coding (Release 8).
R1-081525, "PDCCH Contents", Ericsson, RAN WG1 #52bis, Shenzhen, China, Mar. 2008.
TSG RAN WG1, "LS on DCI Format 1C on MCS and Resource Allocation", R1-082764, Jun. 2008.
Motorola et al., "DCI Format 1C Way Forward", R1-082705, Jun. 2008.
International Search Report issued for International Patent Application No. PCT/JP2009/064278 on Oct. 6, 2009.
Panasonic, "Consideration on Multicarrier Transmission scheme for LTE-Adv uplink", 3GPP Draft; R1-082398, 3GPP TSG RAN WG1 Meeting #53bis, Warsaw, Poland, Jun. 30-Jul. 4, 2008.

SYSTEMS AND METHODS FOR OFDMA AND SC-FDMA SWITCHING

CROSS-REFERENCE TO RELATED APPLICATION

This application is a divisional of U.S. patent application Ser. No. 12/189,697, filed Aug. 11, 2008, and now issued as U.S. Pat. No. 8,509,161.

TECHNICAL FIELD

The present disclosure relates generally to communications and wireless communications systems. More specifically, the present disclosure relates to systems and methods for OFDMA and SC-FDMA switching.

BACKGROUND

Wireless communication devices have become smaller and more powerful in order to meet consumer needs and to improve portability and convenience. Consumers have become dependent upon wireless communication devices such as cellular telephones, personal digital assistants (PDAs), laptop computers, and the like. Consumers have come to expect reliable service, expanded areas of coverage, and increased functionality.

A wireless communication device may be referred to as user equipment, a mobile station, a subscriber station, an access terminal, a remote station, a user terminal, a terminal, a subscriber unit, etc. The term "user equipment" (UE) will be used herein.

A wireless communication system may provide communication for a number of cells, each of which may be serviced by a Node B. A Node B may be a fixed station that communicates with UEs. A Node B may alternatively be referred to as a base station, an access point, or some other terminology. The term "Node B" (NB) will be used herein.

UEs may communicate with one or more Node Bs via transmissions on the uplink and the downlink. The uplink (or reverse link) refers to the communication link from the UEs to the Node B, and the downlink (or forward link) refers to the communication link from the Node B to the UEs. A wireless communication system may simultaneously support communication for multiple UEs.

Wireless communication systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, single carrier frequency division multiple access (SC-FDMA) systems, clustered SC-FDMA, NxSC-FDMA (a natural number N times single carrier frequency division multiple access), and orthogonal frequency division multiple access (OFDMA) systems.

The 3rd Generation Partnership Project, also referred to as "3GPP," is a collaboration agreement that aims to define globally applicable Technical Specifications and Technical Reports for 3rd Generation Systems. 3GPP Long Term Evolution (LTE) is the name given to a project to improve the Universal Mobile Telecommunications System (UMTS) mobile phone or device standard to cope with future requirements. The 3GPP may define specifications for the next generation mobile networks, systems, and devices. In one aspect, UMTS has been modified to provide support and specification for the Evolved Universal Terrestrial Radio Access (E-UTRA) and Evolved Universal Terrestrial Radio Access Network (E-UTRAN).

DETAILED DESCRIPTION

Figure 1:
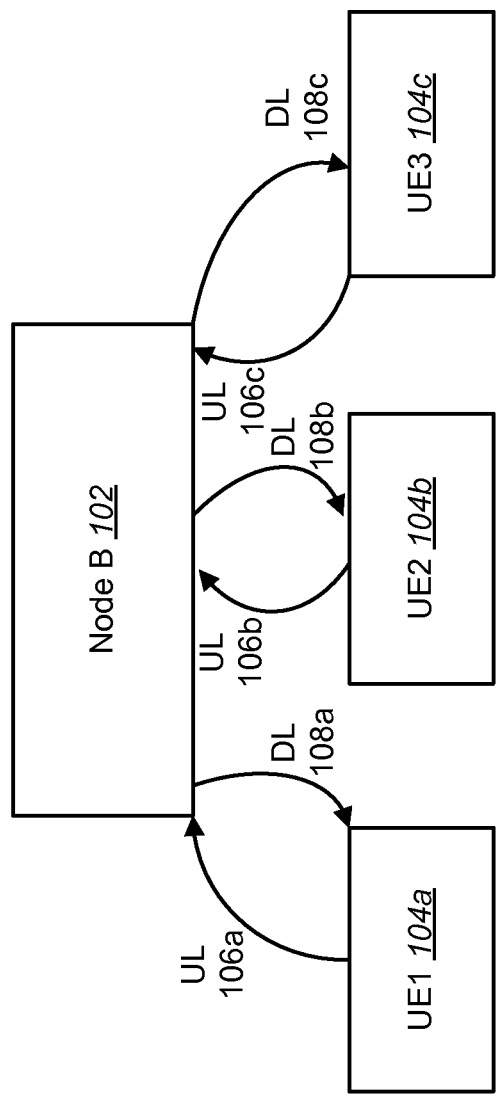
FIG. 1 illustrates a wireless communication system in which the present systems and methods may be practiced.

A method for selecting an uplink modulation scheme may include receiving downlink control information (DCI). The format of the DCI may be decoded. The uplink modulation scheme may be determined according to the format of the DCI. The uplink modulation scheme may be selected. An uplink signal may be transmitted according to the uplink modulation scheme.

In various implementations, the uplink modulation scheme may be single carrier frequency division multiple access (SC-FDMA), orthogonal frequency division multiple access (OFDMA), N (N is a natural number) times single carrier frequency division multiple access (NxSC-FDMA), or clustered single carrier frequency division multiple access (Clustered SC-FDMA). The method may be carried out by a user equipment (UE) using L1/L2 signaling.

Decoding the format of the DCI may include determining if the DCI includes a non-contiguous resource block (RB) allocation. Decoding the format of the DCI may also include determining if the DCI includes a precoding matrix index (PMI). Additionally, decoding the format of the DCI may include determining if the DCI includes only one modulation and coding scheme (MCS). The uplink modulation scheme may be selected according to a DCI switching bit.

The uplink modulation scheme may be orthogonal frequency division multiple access (OFDMA) or clustered single carrier frequency division multiple access (Clustered SC-FDMA) or N (N is a natural number) times single carrier frequency division multiple access (NxSC-FDMA) if the DCI format includes non-contiguous RB (resource block) allocation and/or a precoding matrix index (PMI). The uplink modulation scheme may be single carrier frequency division multiple access (SC-FDMA) if the DCI format does not include non-contiguous RB allocation or a PMI.

The UE may be configured for operation in a 3GPP LTE-Advanced system. The uplink modulation scheme may be orthogonal frequency division multiple access (OFDMA) or clustered single carrier frequency division multiple access (Clustered SC-FDMA) or N (N is a natural number) times single carrier frequency division multiple access (NxSC-FDMA) if the DCI format includes non-contiguous RB (resource block) allocation. The uplink modulation scheme may be single carrier frequency division multiple access (SC-FDMA) if the DCI format includes contiguous RB allocation.

The uplink modulation scheme may be orthogonal frequency division multiple access (OFDMA) or clustered single carrier frequency division multiple access (Clustered SC-FDMA) or N (N is a natural number) times single carrier frequency division multiple access (NxSC-FDMA) if the DCI format includes non-contiguous RB (resource block) allocation. The uplink modulation scheme may be single carrier frequency division multiple access (SC-FDMA) if the DCI format does not include non-contiguous RB allocation and a precoding matrix index (PMI). The uplink modulation scheme may be either OFDMA or SC-FDMA depending on a switching bit in the DCI if the DCI format includes contiguous RB allocation and a precoding matrix index (PMI).

Determining the uplink modulation scheme may include comparing the DCI format to an uplink data transmission table. Formats in the uplink data transmission table may be used to puncture resources allocated to the physical uplink control channel (PUCCH). Puncturing resources may be communicated to the UE via radio resource control (RRC) signaling. RRC signaling may mean "Maximum SRS bandwidth" and/or "PUCCH Resource size" on a broadcast channel (BCH).

A user equipment (UE) that is configured for selecting an uplink modulation scheme is disclosed. The user equipment includes a processor and memory in electronic communication with the processor. Downlink control information (DCI) is received. A format of the DCI is decoded. An uplink modulation scheme is determined according to the format of the DCI. The uplink modulation scheme is selected. An uplink signal is transmitted according to the uplink modulation scheme.

A base station that is configured for selecting an uplink modulation scheme in a wireless communications system is disclosed. The base station includes a processor and memory in electronic communication with the processor. Executable instructions are stored in the memory. A location of a user equipment (UE) is determined. An uplink modulation scheme is determined to be used by the UE. A format for downlink control information (DCI) is selected. The format of the DCI corresponds to the uplink modulation scheme. The DCI is transmitted to the UE.

The base station may be configured for operation in a 3GPP LTE-Advanced system. The format of the DCI may be selected based on a transmission mode of the UE. The format of the DCI may be selected based on the location of the UE. The instructions may be executable to transmit the DCI to the UE using L1/L2 signaling.

A computer readable medium is also disclosed. The computer-readable medium comprises executable instructions. Downlink control information (DCI) is received. A format of the DCI is decoded. An uplink modulation scheme is determined according to the format of the DCI. The uplink modulation scheme is selecting. An uplink signal is transmitted according to the uplink modulation scheme.

The uplink transmission scheme for a 3GPP LTE system is based on SC-FDMA. In 3GPP LTE-Advanced, OFDMA may be added as an uplink transmission scheme in addition to SC-FDMA. NxSC-FDMA and Clustered SC-FDMA may also be added as additional uplink transmission schemes in LTE-Advanced. In an OFDM system, the available spectrum is divided into multiple carriers, called sub-carriers. Each of these sub-carriers is independently modulated by a low rate data stream.

Orthogonal frequency division multiple access (OFDMA) allows the access of multiple users on the available bandwidth by using different orthogonal frequencies to transmit information. OFDMA sends the signals through an IFFT (inverse Fourier Transform) before modulation and transmission. Each user may be assigned a specific time-frequency resource. The data channels may be shared channels; i.e., for each transmission time interval, a new scheduling decision may be taken regarding which users are assigned to which time/frequency resources during that transmission time interval. A radio frame may be divided into a certain number of equally sized slots. A sub-frame may consist of two consecutive slots. OFDMA systems may have a high peak-to-average power ratio (PAPR).

Single carrier frequency division multiple access (SC-FDMA) also allows the access of multiple users on the available bandwidth by using different orthogonal frequencies to transmit information. However, unlike OFDMA, SC-FDMA sends the signals through a DFT (discrete Fourier Transform) before the IFFT, thereby reducing the PAPR but increasing the complexity. SC-FDMA also requires additional complexity at the receiver.

Clustered SC-FDMA is very similar to SC-FDMA. In SC-FDMA, DFT output is mapped to IFFT input contiguously. On the other hand, in clustered SC-FDMA, DFT output is divided into several clusters and mapped to IFFT input. The intervals of these clusters will be filled with zero input. Clustered SC-FDMA will support non-contiguous frequency allocation by this mechanism.

NxSC-FDMA is also similar to SC-FDMA. To achieve non-contiguous frequency allocation, multiple DFTs will be used in NxSC-FDMA. These outputs will be mapped to the IFFT. The output of the IFFT becomes multiple single carrier signals.

Several different channels are defined for a 3GPP LTE system. For transmission on the downlink, user data is carried on the physical downlink shared channel (PDSCH). Downlink control signaling on the physical downlink control channel (PDCCH) is used to convey the scheduling decisions to individual UEs. The PDCCH is located in the first OFDM symbols of a subframe.

Modulation and coding for the shared data channel is not fixed, but is adapted according to radio link quality. The UEs regularly report channel quality indicator (CQI) information to the Node B.

For transmission on the uplink, user data is carried on the physical uplink shared channel (PUSCH). The physical uplink control channel (PUCCH) carries uplink control information, e.g., CQI reports and ACK/NACK information related to data packets received in the downlink. The UE uses the PUCCH when it does not have any data to transmit on the PUSCH. If the UE has data to transmit on the PUSCH, the UE multiplexes the control information with data on the PUSCH.

Data is allocated to the UEs in terms of resource blocks (RB). Resource blocks are used to describe the mapping of certain physical channels to resource elements. A physical resource block is defined as a certain number of consecutive OFDM symbols in the time domain and a certain number of consecutive subcarriers in the frequency domain.

FIG. 1 illustrates a wireless communication system 100 in which the present systems and methods may be practiced. In a communications system 100, transmission signals may be sent from a mobile station to a base station and from a base station to a mobile station. Communications from the mobile station to the base station may be referred to as uplink communications 106. Similarly, communications from the base station to the mobile station may be referred to as downlink communications 108.

The present systems and methods described herein relate to 3GPP LTE Advanced systems. However, the present systems and methods may be utilized for other communication systems such as IEEE 802.16 (WiMAX) systems, and other systems where the scheduling of users is applicable.

The base station may be referred to as a Node B 102. The mobile station may be referred to as user equipment (UE) 104. A Node B 102 may be in wireless communication with one or more UEs 104 (which may also be referred to as user devices, communications devices, subscriber units, access terminals, terminals, etc.). The Node B 102 may be a unit adapted to transmit to and receive data from cells. Although not shown, a wireless communication system 100 may include more than one Node B 102 and more than the three UEs 104 shown in FIG. 1.

In one example, the Node B 102 handles the communication across a radio interface, covering a specific geographical area in the vicinity of the Node B 102, which is referred to as a cell. Depending on sectoring, one or more cells may be served by the Node B 102, and accordingly the Node B 102 may support one or more UEs 104 depending on where the UEs 104 are located. In one configuration, the Node B 102 provides a 3GPP (Release 8) Long Term Evolution (LTE) air interface and performs radio resource management for the communication system 100. In another configuration, the Node B 102 provides a 3GPP LTE-Advanced air interface.

As discussed above, the Node B 102 may be in electronic communication with one or more UEs 104. A first UE 104a, a second UE 104b, and a third UE 104c are shown in FIG. 1. The Node B 102 may transmit data to the UEs 104 and receive data from the UEs 104 over a radio frequency (RF) communication channel.

The signals transmitted by a UE 104 may include requests for data. The signals transmitted by the Node B 102 may be data requested by a particular UE 104 such as downloaded Internet data. Alternatively, the signals transmitted by the Node B 102 and UEs 104 may include data for maintaining the wireless communication system 100. For example, the Node B 102 may transmit reference signals to the UEs 104 requesting channel estimation and the UEs 104 may return channel estimation values to the Node B 102. Examples of possible reference signals include pilots or beacons which may be single tone signals with a known amplitude and frequency. Another example may be a reference signal used in current LTE systems, which is a known (by transmitter and receiver) sequence of symbols used for estimating the channel. A further example of a reference signal may be Zadoff-Chu sequences as described in 3GPP TS 36.211 V8.2.0 (2008-03).

The Node B 102 may also transmit control information to the UEs 104. The control information may include instructions for the uplink modulation scheme to be used by a UE 104. For example, the Node B 102 may transmit control information to a UE 104 that instructs the UE 104 to transmit uplink information using OFDMA, SC-FDMA, clustered SC-FDMA, or NxSC-FDMA.

A scheduler on the Node B 102 may determine the service parameters, such as the coding and modulation scheme of a UE 104 before it is served. The scheduler may assign one or more UEs 104 to each communication channel. To perform this task, the Node B 102 may use channel quality information of all the UEs 104 over at least a portion of the frequency band.

Figure 2:
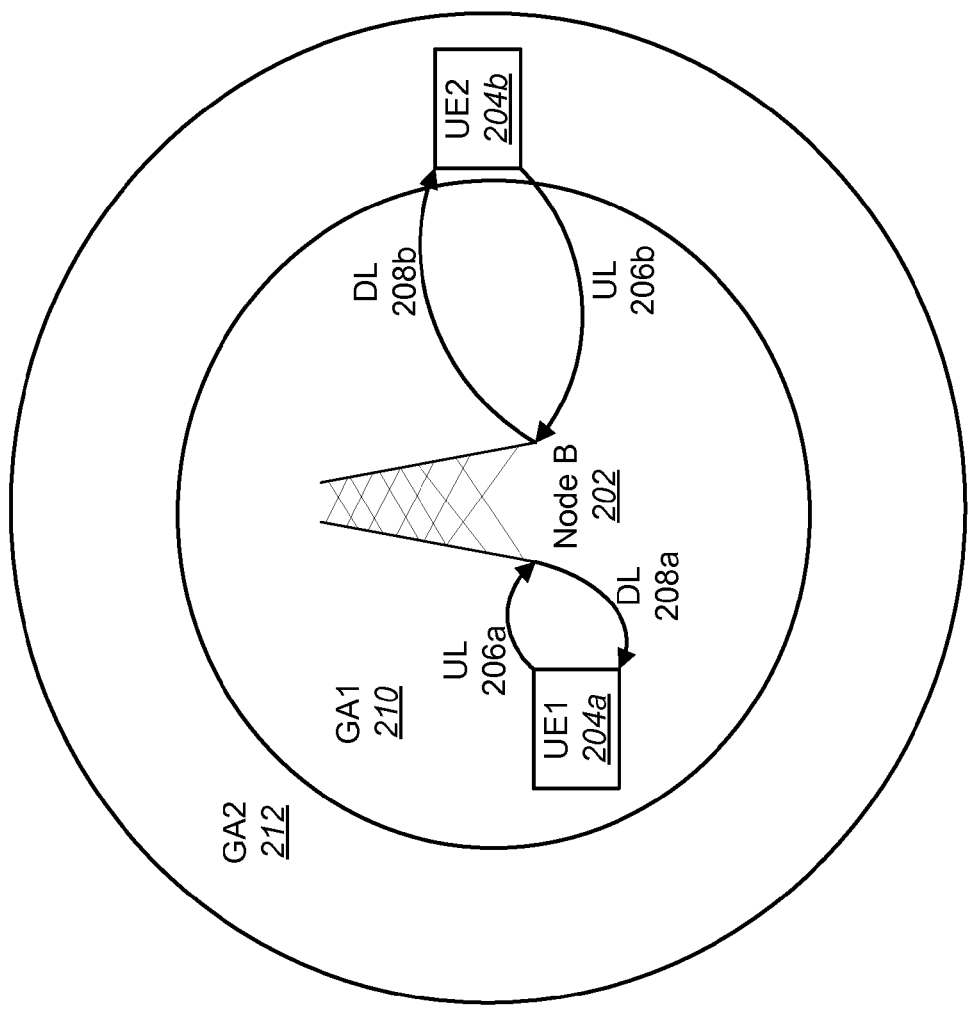
FIG. 2 illustrates a wireless communication system in which the present systems and methods may be practiced.

FIG. 2 illustrates a wireless communication system 200 in which the present systems and methods may be practiced. The wireless communication system 200 may include a Node B 202. The Node B 202 may be in electronic communication with a first UE 204a and a second UE 204b. The Node B 202 may send information to the first UE 204a over a downlink transmission 208a and receive information from the first UE 204a over an uplink transmission 206a. Likewise, the Node B 202 may send information to the second UE 204b over a downlink transmission 208b and receive information from the second UE 204b over an uplink transmission 206b.

The Node B 202 may be surrounded by one or more geographic areas. In FIG. 2, the Node B 202 is surrounded by two geographic areas, GA1 210 and GA2 212. The geographic areas may define the areas within a relative distance from the Node B 202. For example, GA1 210 may include all the area that is within a certain radius of the Node B 202. Likewise, GA2 212 may include all the area that is within a certain radius of the Node B 202 that is not included in GA1 210. Alternatively, GA2 212 may include all the area that is not included in GA1 210.

The Node B 202 may make scheduling decisions for a particular UE 204 based on the location of the UE 204. For example, a UE 204 in GA1 210 may receive different scheduling parameters than a UE 204 in GA2 212. The Node B 202 may determine the location of a particular UE 204 based on the received channel quality information from the UE 204.

In FIG. 2, UE1 204a is shown as operating within GA1 210 and UE2 204b is shown as operating within GA2 212. The Node B 202 may instruct UE1 204a and UE2 204b to send uplink transmissions 206 to the Node B 202. The uplink transmissions 206a of UE1 204a may use different modulation schemes than the uplink transmissions 206b of UE2 204b. For example, in LTE-Advanced, a UE 204 may make use of SC-FDMA or OFDMA/clustered SC-FDMA/NxSC-FDMA as uplink modulation schemes. By using an OFDMA modulation scheme, the communication system 200 may introduce advanced receivers for receiving MIMO. When MIMO communications are used, OFDMA may have the benefit of reducing the complexity of the receiver. SC-FDMA may have the benefit of reducing the PAPR and/or the cubic metric (CM). Thus, it may be beneficial for UE1 204a to use an OFDMA modulation scheme when sending uplink transmissions 206a to the Node B 202 because UE1 204a is within GA1 210 and is thus relatively close to the Node B 202. Likewise, it may be beneficial for UE2 204b to use an SC-FDMA modulation scheme when sending uplink transmissions 206b to the Node B 202 because UE2 204b is within GA2 212 and is thus on (or near) the cell edge.

Figure 3:
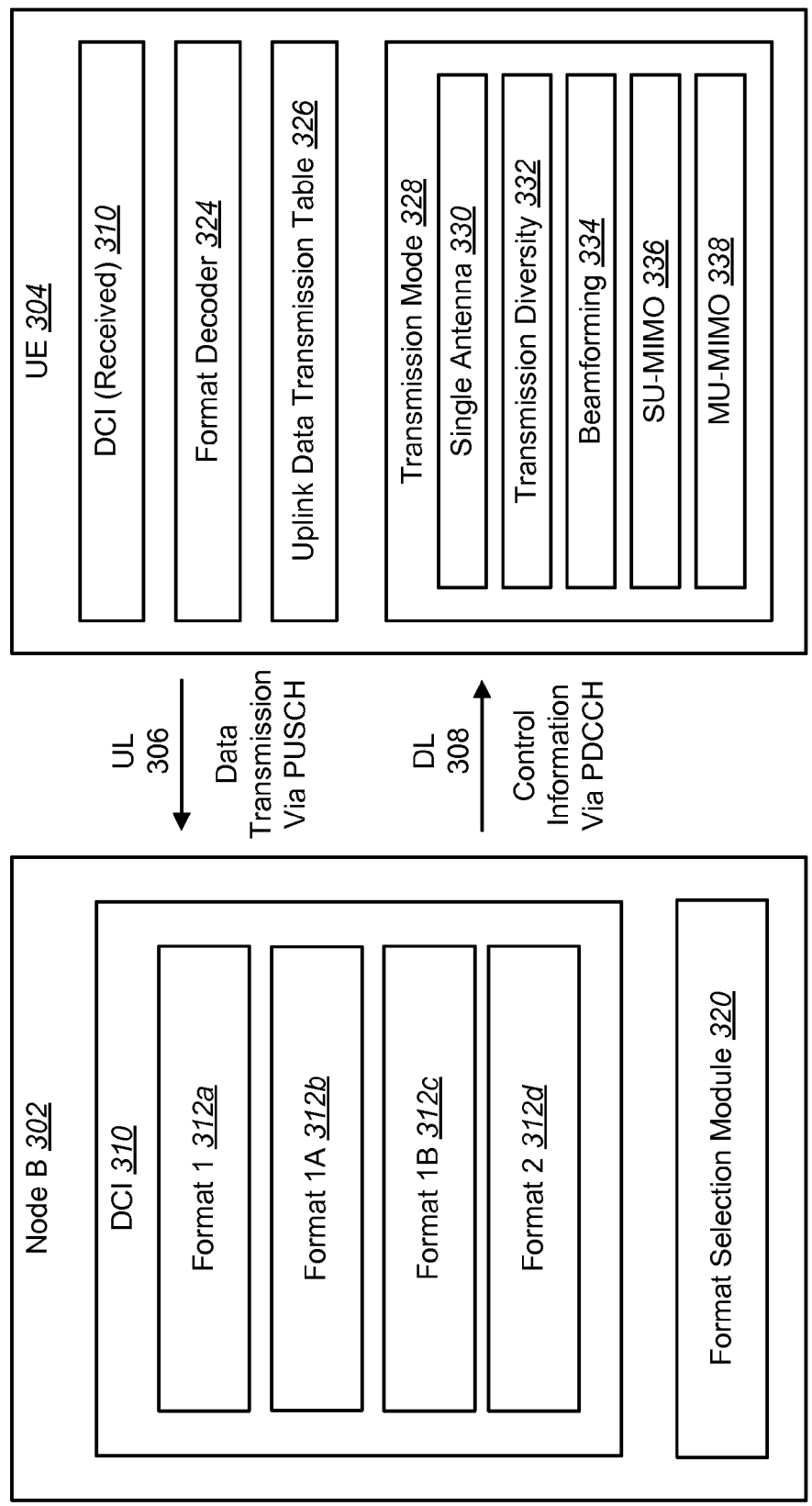
FIG. 3 illustrates various components that may be utilized to implement the present systems and methods.

FIG. 3 illustrates various components that may be utilized to implement the present systems and methods. A Node B 302 is shown. The Node B 302 may include downlink control information (DCI) 310 to be sent to a UE 304. The DCI 310 may be transmitted to the UE 304 via a downlink transmission 308 (e.g., via the PDCCH). A DCI 310 may be sent in a particular format 312. For example, the DCI 310 may be in Format 1 312a, Format 1A 312b, Format 1B 312c, and Format 2 312d.

DCI Format 1A is used for the scheduling of PUSCH. Table 1-1 includes examples of information that may be transmitted by means of the DCI Format 1A. Table 1-1 includes a column showing the field and another column for explanatory comments regarding the field.

TABLE 1-1

| Field | Comment |
| --- | --- |
| Format | Uplink grant or downlink assignment (Flag for UL/DL differentiation) |
| Hopping Flag | Frequency hopping on/off |
| RB Allocation | |
| MCS | |
| New Data Indicator | Toggled for each new transport block |
| TPC | Power control of PUSCH |
| Cyclic Shift for DMRS | FFS if always present or not (may depend on design of format 1A) |
| CQI Request | |
| RNTI/CRC | 16 bit RNTI implicitly encoded in CRC |

The format may be a flag for UL/DL (Uplink/Downlink) differentiation. In one configuration this field may be 1 bit. The hopping flag may also be 1 bit. The resource block allocation is included. The MCS is the modulation and coding scheme (and redundancy version), and it may be 5 bits in one configuration. The new data indicator may be 1 bit. The TPC (Transmit Power Control) field is the command for the scheduled PUSCH and may be 2 bits. The cyclic shift for DMRS (Demodulation Reference Signals) may be 3 bits in one configuration. The CQI request may be 1 bit. The last field shown in Table 1-1 is the RNTI/CRC (Radio Network Temporary Identity/Cyclic Redundancy Check) that may be a 16 bit field RNTI implicitly encoded in the CRC.

These are examples of possible contents of Format 1A. Format 1A may include other information and/or may not include some of the above information.

DCI Format 1 is used for the scheduling of PUSCH. Table 1-2 includes examples of information that may be transmitted by means of the DCI Format 1. Table 1-2 includes a column showing the field and another column for explanatory comments regarding the field.

TABLE 1-2

| Field | Comment |
| --- | --- |
| Format | Uplink grant or downlink assignment (Flag for UL/DL differentiation) |
| Resource Allocation Header | Indicates allocation type 0 or 1 (type 2 uses payload A, same as UL) |
| Hopping Flag | Frequency hopping on/off |
| RB Allocation | |
| MCS | |
| New Data Indicator | Toggled for each new transport block |
| TPC | Power control of PUSCH |
| Cyclic Shift for DMRS | FFS if always present or not (may depend on design of format 1A) |
| CQI Request | |
| RNTI/CRC | 16 bit RNTI implicitly encoded in CRC |

The format may be a flag for UL/DL differentiation. In one configuration this field may be 1 bit. A resource allocation header may indicate the resource allocation type (type 0 or type 1) and may also be 1 bit. The hopping flag may also be 1 bit. The resource block allocation is included. The MCS is the modulation and coding scheme (and redundancy version), and it may be 5 bits in one configuration. The new data indicator may be 1 bit. The TPC field is the command for the scheduled PUSCH and may be 2 bits. The cyclic shift for DMRS may be 3 bits in one configuration. The CQI request may be 1 bit. The last field shown in Table 1-2 is the RNTI/CRC (Radio Network Temporary Identity/Cyclic Redundancy Check) that may be a 16 bit field RNTI implicitly encoded in the CRC.

These are examples of possible contents of Format 1. Format 1 may include other information and/or may not include some of the above information.

DCI Format 1B is used for the scheduling of PUSCH. Table 1-3 includes examples of information that may be transmitted by means of the DCI Format 1B. Table 1-3 includes a column showing the field and another column for explanatory comments regarding the field.

TABLE 1-3

| Field | Comment |
| --- | --- |
| Format | Uplink grant or downlink assignment (Flag for UL/DL differentiation) |
| Hopping Flag | Frequency hopping on/off |
| RB Allocation | |
| MCS | |
| Precoding Information | Precoding matrix (4 bits for 4Tx, 1-3 bits for 2Tx). FFS if this field can be removed and semi-static configuration is used instead. |
| New Data Indicator | Toggled for each new transport block |
| TPC | Power control of PUSCH |
| Cyclic Shift for DMRS | FFS if always present or not (may depend on design of format 1A) |
| CQI Request | |
| RNTI/CRC | 16 bit RNTI implicitly encoded in CRC |

The format may be a flag for UL/DL differentiation. In one configuration this field may be 1 bit. The hopping flag may also be 1 bit. The resource block allocation is included. The MCS is the modulation and coding scheme (and redundancy version), and it may be 5 bits in one configuration. The precoding information or Precoding Matrix Index (PMI) may also be included. The new data indicator may be 1 bit. The TPC field is the command for the scheduled PUSCH and may be 2 bits. The cyclic shift for DMRS may be 3 bits in one configuration. The CQI request may be 1 bit. The last field shown in Table 1-3 is the RNTI/CRC that may be a 16 bit field RNTI implicitly encoded in the CRC.

These are examples of possible contents of Format 1B. Format 1B may include other information and/or may not include some of the above information.

DCI Format 2 is used for the scheduling of PUSCH. Table 1-4 includes examples of information that may be transmitted by means of the DCI Format 2. Table 1-4 includes a column showing the field and another column for explanatory comments regarding the field.

TABLE 1-4

| Field | Comment |
| --- | --- |
| Format | Uplink grant or downlink assignment (Flag for UL/DL differentiation) |
| Resource Allocation Header | Indicates allocation type 0 or 1 (type 2 uses payload A, same as UL) |
| Hopping Flag | Frequency hopping on/off |
| RB Allocation | |
| Number of Layers | 1, 2, 3, 4 layers. Number of bits may depend on the number of Tx antennas (2 for 4Tx, 0 otherwise). Also may depend on the number of Rx antennas in the UE. |

TABLE 1-4-continued

| Field | Comment |
| --- | --- |
| Precoding Information | Precoding matrix (4 bits for 4Tx, 1-3 bits for 2Tx). FFS if this field can be removed and semi-static configuration is used instead. |
| MCS, first transport block | |
| MCS, second transport block | |
| New Data Indicator (1st TB) | Toggled for each new transport block |
| New Data Indicator (2nd TB) | Toggled for each new transport block |
| HARQ Swap Flag | Indicates whether the two transport blocks should be swapped before being fed to the soft buffers (for the two transport blocks) |
| TPC | Power control of PUSCH |
| Cyclic Shift for DMRS | FFS if always present or not (may depend on design of format 1A) |
| CQI Request | |
| RNTI/CRC | 16 bit RNTI implicitly encoded in CRC |

The format may be a flag for UL/DL (Uplink/Downlink) differentiation. In one configuration this field may be 1 bit. A resource allocation header may indicate the resource allocation type (type 0 or type 1) and may also be 1 bit. The hopping flag may also be 1 bit. The resource block allocation is included. The number of layers may indicate the number of layers. The number of bits for the number of layers field may depend on various factors including the number of antennas. The precoding information or Precoding Matrix Index (PMI) may also be included. There may be two codewords or two transport blocks. The MCS for the first transport block is the modulation and coding scheme (and redundancy version) for the first transport block, and it may be 5 bits in one configuration. There may also be an MCS for the second transport block. The new data indicator for the first transport block may be 1 bit. The new data indicator for the second transport block may also be 1 bit.

An HARQ (hybrid automatic repeat request) Swap Flag may indicate whether the two transport blocks should be swapped before being fed to the soft buffers (for the two transport blocks). The TPC field is the command for the scheduled PUSCH and may be 2 bits. The cyclic shift for DMRS may be 3 bits in one configuration. The CQI request may be 1 bit. The last field shown in Table 1-4 is the RNTI/CRC that may be a 16 bit field RNTI implicitly encoded in the CRC.

These are examples of possible contents of Format 2. Format 2 may include other information and/or may not include some of the above information.

The meaning of the DCI formats 312 are described in more detail in 3GPP TS 36.212 v8.2.0 which applies to 3GPP LTE. LTE-Advanced is an extension of LTE. The pertinent DCI formats 312 are shown in Table 1-5. The DCI formats 312 may include assignments for the uplink data transmission. For example, the DCI formats 312 may include contiguous RB allocation, non-contiguous RB allocation, modulation and coding schemes (MCS), and a precoding matrix index (PMI).

TABLE 1-5

| | RB Allocation | Contents |
| --- | --- | --- |
| Format 1 | Non-Contiguous | RB allocation, MCS, etc. |
| Format 1A | Contiguous | RB allocation, MCS, etc. |
| Format 1B | Contiguous | RB allocation, MCS, PMI, etc. |
| Format 2 | Non-Contiguous | RB allocation, MCS for codeword 1, MCS for codeword 2, PMI, etc. |

Table 1-5 illustrates that Format 1B 312c and Format 2 312d include PMI information. Format 1B 312c includes only one piece of MCS information while Format 2 312d includes two pieces of MCS information. The Node B 302 may include a format selection module 320 for selecting the appropriate DCI format 312 to be transmitted to the UE 304.

The format 312 of the DCI 310 may depend on the transmission mode 328 of the UE 304. Table 2 lists the transmission modes 328 and the corresponding DCI formats 312. The transmission mode 328 of the UE 304 is assumed to be configured by the Node B 302 via radio resource control (RRC) signaling. Format 1 312a and Format 1A 312b may be used for single input multiple output (SIMO) transmissions such as transmit diversity and beamforming. Format 2 312d and Format 1A 312b may be used for single user-MIMO (SU-MIMO) transmissions. Format 1B 312c and Format 1A 312b may be used for multiple user-MIMO (MU-MIMO) transmissions or RANK-1 SU-MIMO. RANK-1 SU-MIMO is a subset of SU-MIMO. The difference between SU-MIMO and RANK-1 SU-MIMO is that there is no layer multiplexing and only one codeword will be transmitted in RANK-1 SU-MIMO.

TABLE 2

| Transmission Mode | Formats |
| --- | --- |
| Single Antenna/Transmission Diversity/Beamforming | Format 1/Format 1A |
| SU-MIMO | Format 2/Format 1A |
| MU-MIMO | Format 1B/Format 1A |

User equipment (UE) 304 is also shown in FIG. 3. The UE 304 may include a received DCI 310. The DCI 310 may be received from the Node B 302. The UE 304 may also include a format decoder 324. The format decoder 324 may be configured to determine the format of the received DCI 310. The UE 304 may include an uplink data transmission table 326. The uplink data transmission table 326 may be configured to specify the uplink modulation scheme for the UE 304 according to the format of the received DCI 310. For example, the uplink data transmission table 326 may specify that the UE 304 is to use OFDMA as the uplink modulation scheme for certain formats of received DCI 310 and SC-FDMA for other formats of received DCI 310. Examples of uplink data transmission tables 326 used in the present systems and methods are shown in Table 3, Table 4, and Table 5.

TABLE 3

| | RB Allocation | Contents | Uplink Modulation Scheme |
| --- | --- | --- | --- |
| Format 1 | Non-Contiguous | RB allocation, MCS, etc. | OFDMA |
| Format 1A | Contiguous | RB allocation, MCS, etc. | SC-FDMA |
| Format 1B | Contiguous | RB allocation, MCS, PMI, etc. | OFDMA |
| Format 2 | Non-Contiguous | RB allocation, MCS for codeword 1, MCS for codeword 2, PMI, etc. | OFDMA |

TABLE 4

| | RB Allocation | Contents | Uplink Modulation Scheme |
| --- | --- | --- | --- |
| Format 1 | Non-Contiguous | RB allocation, MCS, etc. | OFDMA |
| Format 1A | Contiguous | RB allocation, MCS, etc. | SC-FDMA |

TABLE 4-continued

| RB Allocation | | Contents | Uplink Modulation Scheme |
|---|---|---|---|
| Format 1B | Contiguous | RB allocation, MCS, PMI, etc. | SC-FDMA |
| Format 2 | Non-Contiguous | RB allocation, MCS for codeword 1, MCS for codeword 2, PMI, etc. | OFDMA |

TABLE 5

| RB Allocation | | Contents | Uplink Modulation Scheme |
|---|---|---|---|
| Format 1 | Non-Contiguous | RB allocation, MCS, etc. | OFDMA |
| Format 1A | Contiguous | RB allocation, MCS, etc. | SC-FDMA |
| Format 1B | Contiguous | RB allocation, MCS, PMI, SC-FDMA/OFDMA switching bit, etc. | SC-FDMA/ OFDMA |
| Format 2 | Non-Contiguous | RB allocation, MCS for codeword 1, MCS for codeword 2, PMI, etc. | OFDMA |

As discussed above, the UE 304 may operate in different transmission modes 328. For example, the UE 304 may operate in single antenna mode 330, transmission diversity mode 332, beamforming mode 334, SU-MIMO mode 336, and MU-MIMO mode 338. The Node B 302 may select the format of the DCI 310 according to the transmission mode 328 of the UE 304. Upon selection of a modulation scheme for the uplink transmission 306, the UE 304 may then send an uplink transmission 306 to the Node B 302 according to the selected modulation scheme. Thus, the uplink transmission 306 may be modulated according to SC-FDMA or OFDMA/clustered SC-FDMA/NxSC-FDMA.

Figure 4:
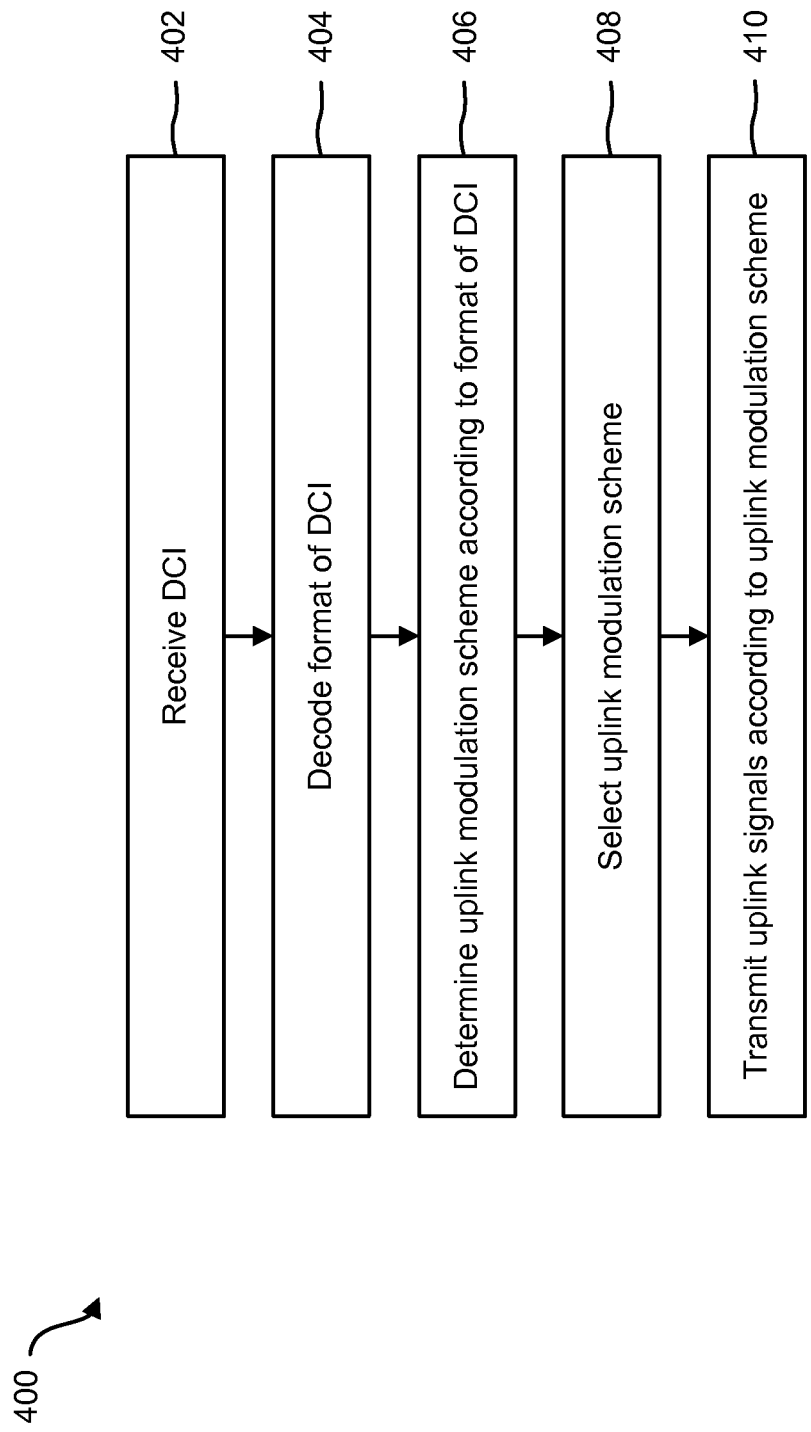
FIG. 4 is a flow diagram illustrating a method for switching between SC-FDMA and OFDMA as the uplink modulation scheme.

FIG. 4 is a flow diagram illustrating a method 400 for switching between SC-FDMA and OFDMA as the uplink modulation scheme. The method 400 of FIG. 4 may also be applied to switching between SC-FDMA and clustered SC-FDMA, and to switching between SC-FDMA and NxSC-FDMA. The UE 304 may receive 402 a DCI 310. The UE 304 may decode 404 the format 312 of the DCI 310. The UE 304 may then determine 406 the uplink modulation scheme by comparing the format of the received DCI 310 with the uplink data transmission table 326. The UE 304 may select 408 the appropriate uplink modulation scheme. The UE 304 may then transmit 410 the uplink data signal according to the uplink modulation scheme.

Figure 5:
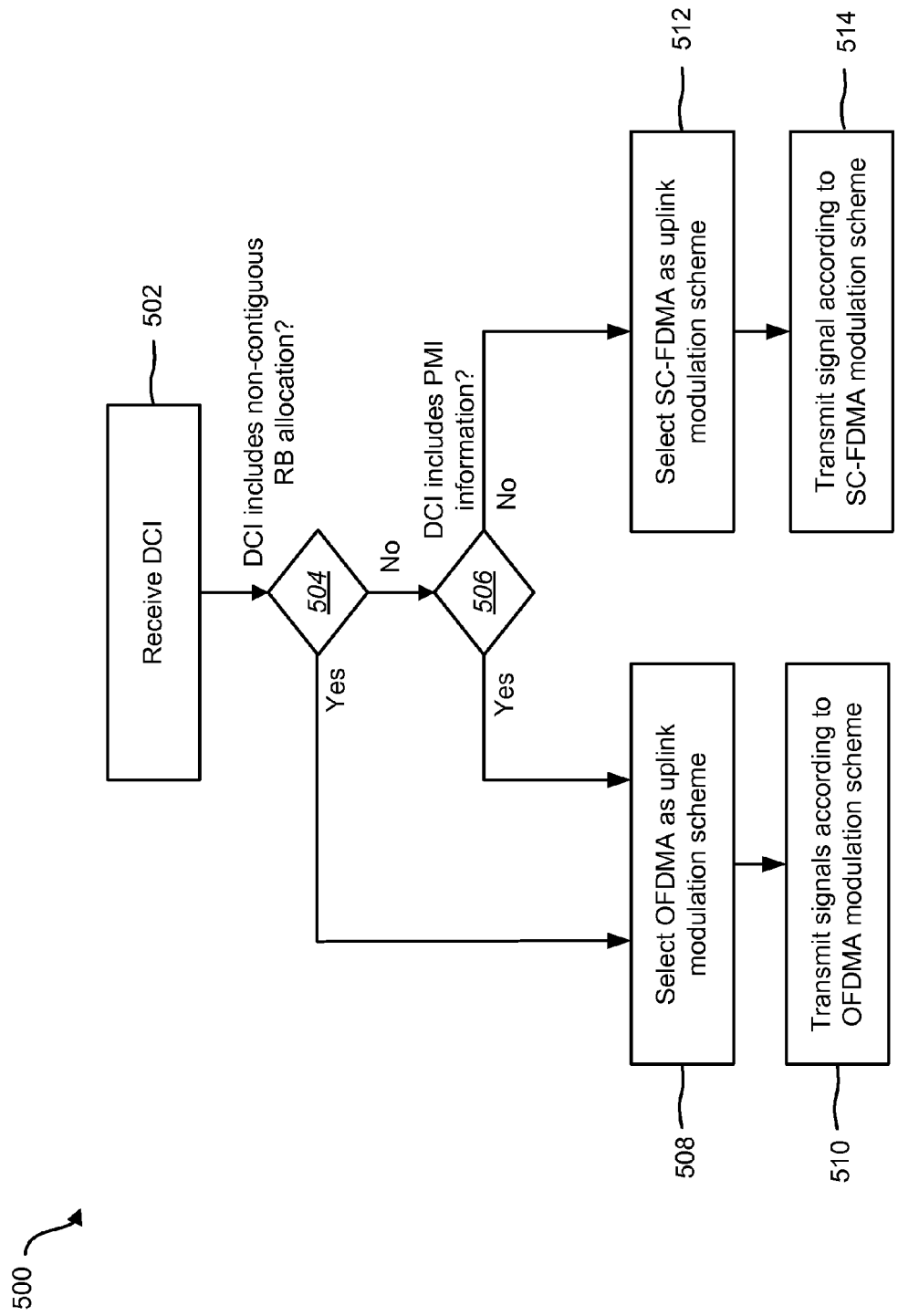
FIG. 5 is a flow diagram illustrating a more detailed method for switching between SC-FDMA and OFDMA as the uplink modulation scheme.

FIG. 5 is a flow diagram illustrating a more detailed method 500 for switching between SC-FDMA and OFDMA as the uplink modulation scheme. Although not shown, the method 500 of FIG. 5 may also be applied to switching between SC-FDMA and clustered SC-FDMA, and to switching between SC-FDMA and NxSC-FDMA. The UE 304 may receive 502 a DCI 310. The UE 304 may determine 504 whether the received DCI 310 includes a non-contiguous RB allocation. If the DCI 310 includes a non-contiguous RB allocation, the UE 304 may select 508 OFDMA as the uplink modulation scheme. The UE 304 may then transmit 510 signals according to the OFDMA modulation scheme. If the DCI 310 does not include a non-contiguous RB allocation, the UE 304 may determine 506 whether the received DCI 310 includes PMI information. If the received DCI 310 includes PMI information, the UE 304 may select 508 OFDMA as the uplink modulation scheme and transmit 510 signals according to the OFDMA modulation scheme. If the received DCI 310 does not include PMI information, the UE 304 may select 512 SC-FDMA as the uplink modulation scheme. The UE 304 may then transmit 514 signals according to the SC-FDMA modulation scheme.

Figure 6:
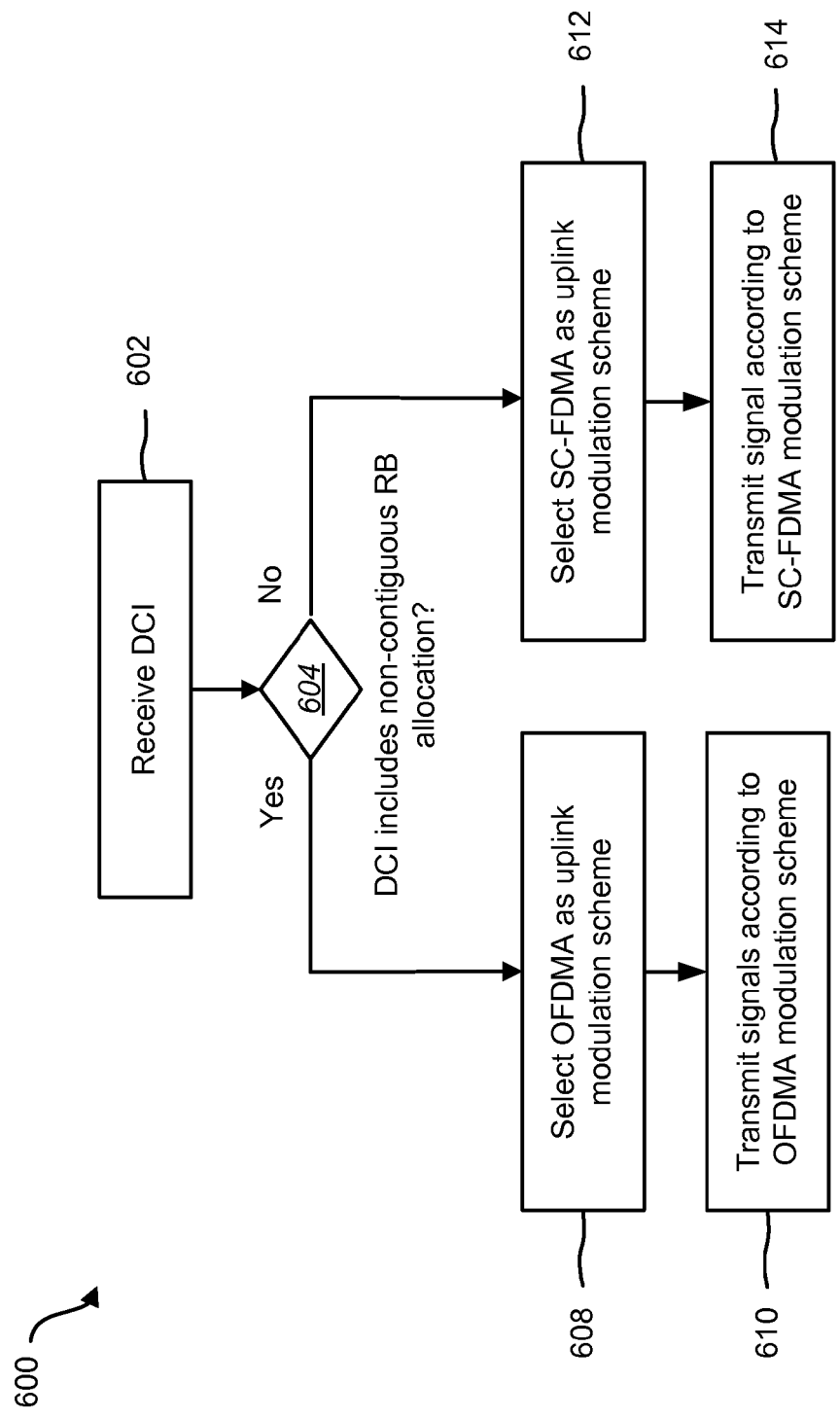
FIG. 6 is a flow diagram illustrating an alternative method for switching between SC-FDMA and OFDMA as the uplink modulation scheme.

FIG. 6 is a flow diagram illustrating an alternative method 600 for switching between SC-FDMA and OFDMA as the uplink modulation scheme. Although not shown, the method 600 of FIG. 6 may also be applied to switching between SC-FDMA and clustered SC-FDMA, and to switching between SC-FDMA and NxSC-FDMA. The UE 304 may receive 602 a DCI 310. The UE 304 may determine 604 whether the received DCI 310 includes a non-contiguous RB allocation. If the DCI 310 includes a non-contiguous RB allocation, the UE 304 may select 608 OFDMA as the uplink modulation scheme and may then transmit 610 signals according to the OFDMA modulation scheme. If the DCI 310 does not include a non-contiguous RB allocation, the UE 304 may select 612 SC-FDMA as the uplink modulation scheme. The UE 304 may then transmit 614 signals according to the SC-FDMA modulation scheme.

Figure 7:
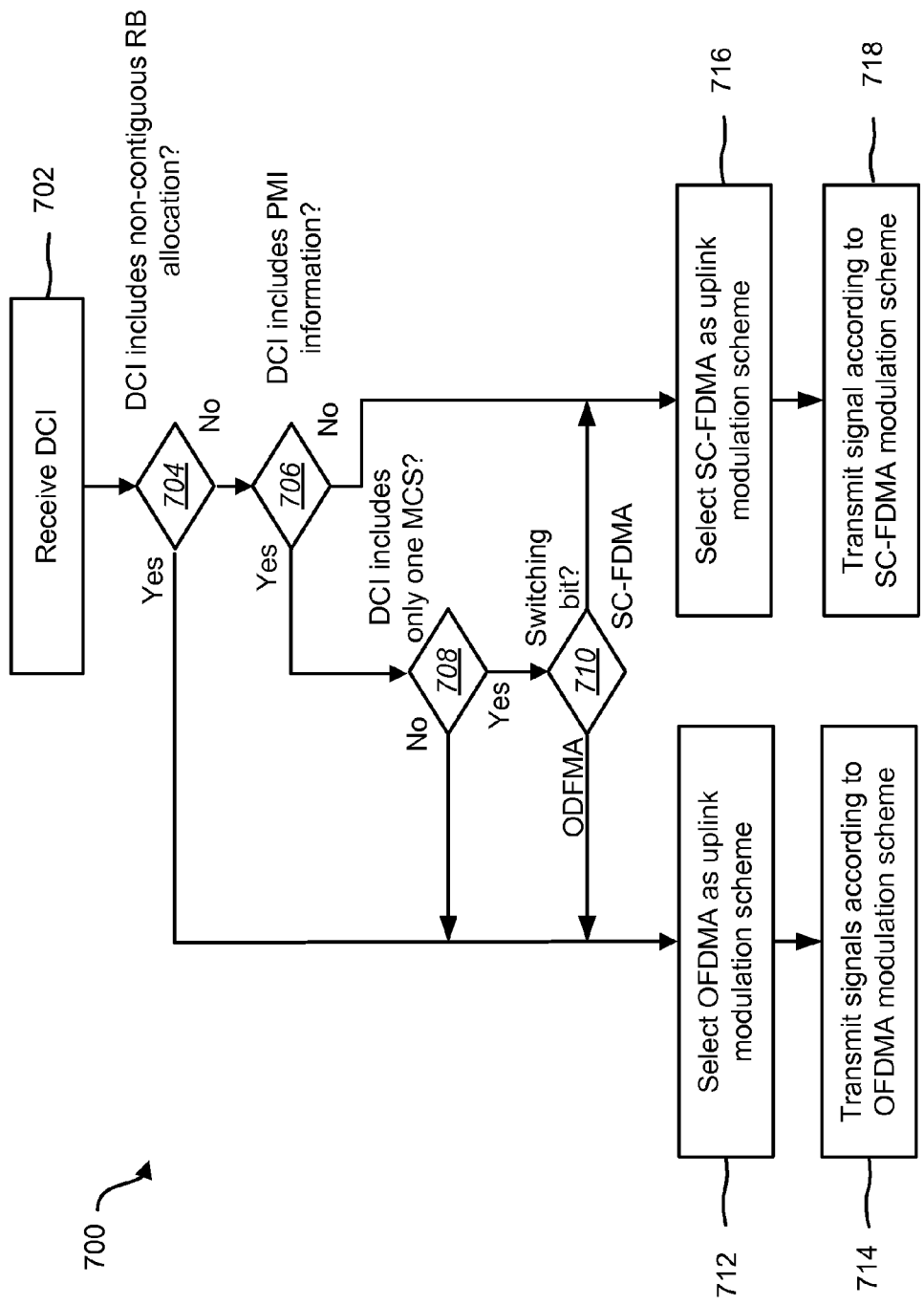
FIG. 7 is a flow diagram illustrating another method for switching between SC-FDMA and OFDMA as the uplink modulation scheme.

FIG. 7 is a flow diagram illustrating another method 700 for switching between SC-FDMA and OFDMA as the uplink modulation scheme. Although not shown, the method 700 of FIG. 7 may also be applied to switching between SC-FDMA and clustered SC-FDMA, and to switching between SC-FDMA and NxSC-FDMA. The UE 304 may first receive 702 a DCI 310. The UE 304 may determine 704 whether the received DCI 310 includes a non-contiguous RB allocation. If the DCI 310 includes a non-contiguous RB allocation, the UE 304 may select 712 OFDMA as the uplink modulation scheme. If the DCI 310 does not include a non-contiguous RB allocation, the UE 304 may then determine 706 whether the DCI 310 includes PMI information.

If the DCI 310 does not include PMI information, the UE 304 may select 716 SC-FDMA as the uplink modulation scheme. If the DCI 310 does include PMI information, the UE 304 may determine 708 whether the DCI 310 includes only one MCS. If the DCI 310 does not include only one MCS (and thus includes more than one MCS), the UE 304 may select 712 OFDMA as the uplink modulation scheme. If the DCI 310 does include only one MCS, the format of the DCI 310 is Format 1B 312c and the UE 304 may determine 710 whether the switching bit in Format 1B 312c is set to OFDMA or SC-FDMA. If the switching bit in Format 1B 312c is set to OFDMA, the UE 304 may select 712 OFDMA as the uplink modulation scheme. If the switching bit in Format 1B 312c is set to SC-FDMA, the UE 304 may select 716 SC-FDMA as the uplink modulation scheme.

Once the UE 304 has selected OFDMA as the uplink modulation scheme, the UE 304 may transmit 714 signals on the uplink according to the OFDMA modulation scheme. Likewise, once the UE 304 has selected SC-FDMA as the uplink modulation scheme, the UE 304 may transmit 718 signals on the uplink according to the SC-FDMA modulation scheme.

Figure 8:
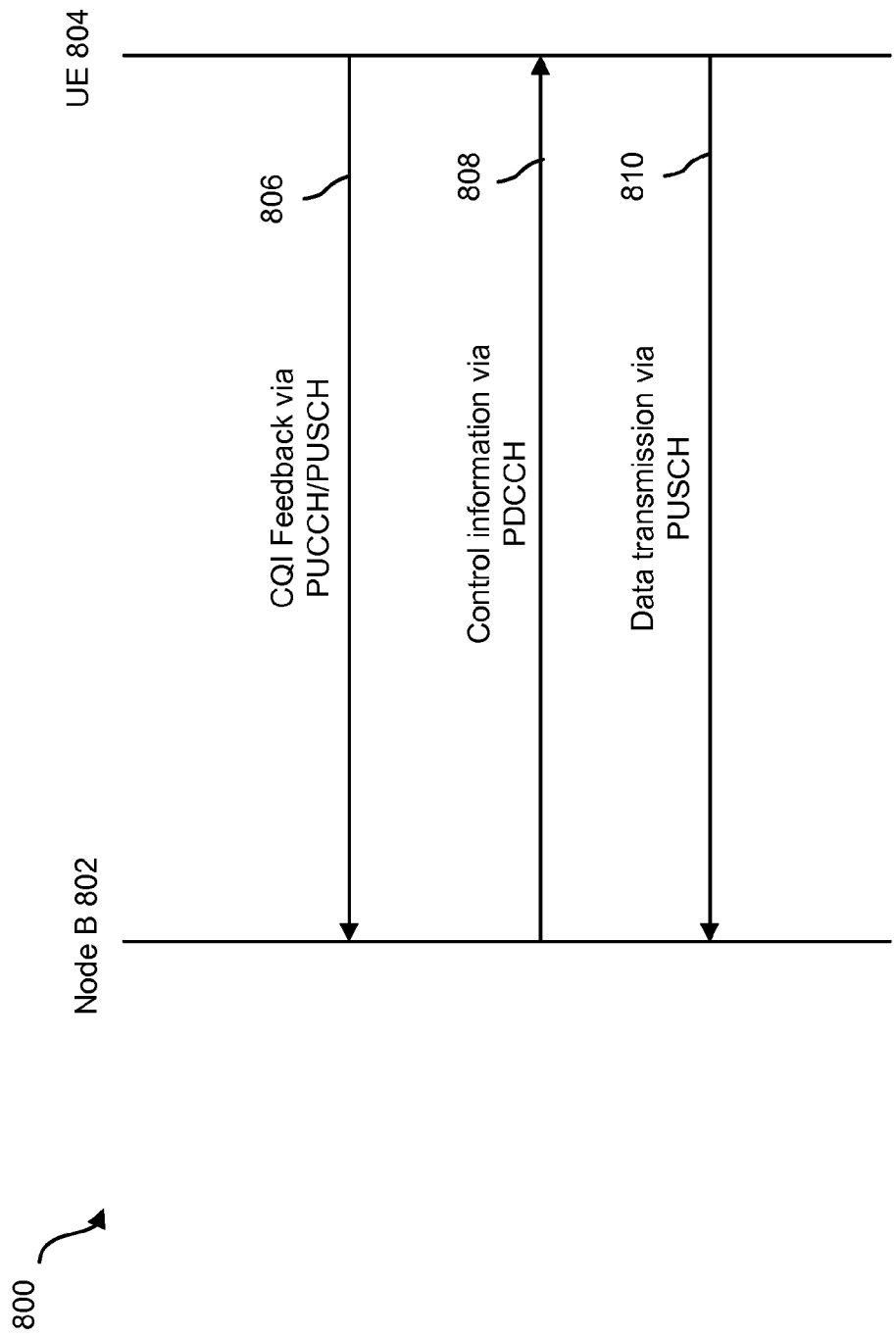
FIG. 8 illustrates L1/L2 signaling between the Node B and the UE.

FIG. 8 illustrates L1/L2 signaling between the Node B 802 and the UE 804. L1/L2 signaling is the sending of control information from the Node B 802 to the UE 804 via the PDCCH. The UE 804 sends CQI feedback to the Node B 802 via the PUCCH/PUSCH 806. The Node B 802 sends control information to the UE 804 via the PDCCH 808. The control information on the PDCCH 808 may include a DCI 310 to instruct the UE 804 whether to select SC-FDMA or OFDMA as the uplink modulation scheme. The UE 804 may then send the uplink data transmission via the PUSCH 810. The uplink data transmission on the PUSCH 810 may be modulated according to the selected uplink modulation scheme.

Figure 9:
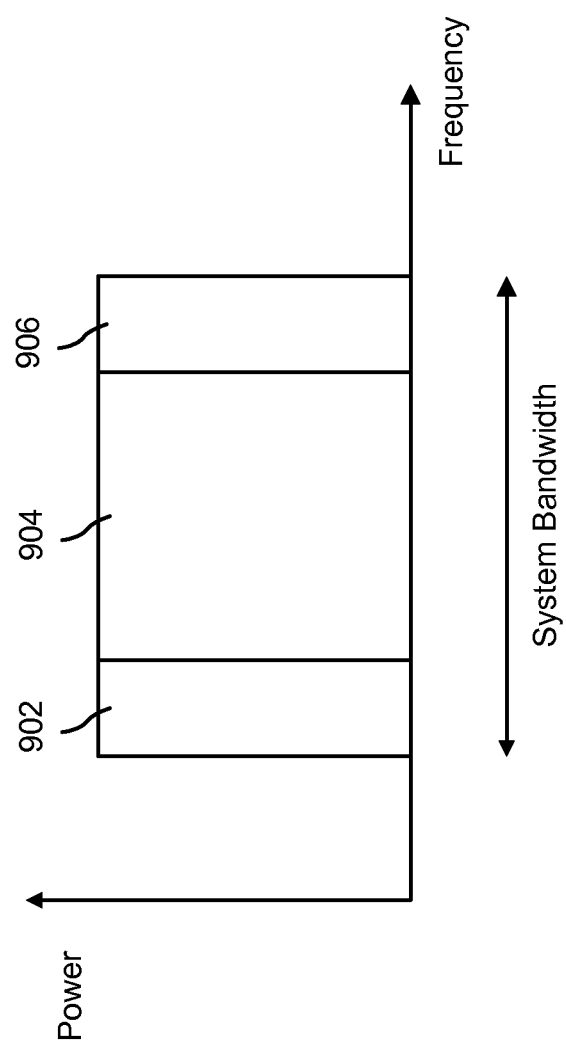
FIG. 9 illustrates the resource block (RB) allocation of an LTE uplink transmission.

FIG. 9 illustrates the RB allocation of an LTE uplink transmission. The RB allocation may be a contiguous allocation in an SC-FDMA transmission such as Format 1A 312b and Format 1B 312c. Both edges of the system bandwidth are allocated to PUCCH 902, 906 and the interior bandwidth is allocated to PUSCH 904. The sub-band for an LTE RB in a Release 8 UE is 20 MHz. In LTE-Advanced systems, the system bandwidth may be expanded to 40 MHz or more. Because LTE-Advanced requires backwards compatibility with LTE, the spectrum allocation for LTE-Advanced UEs will be non-contiguous when the bandwidth is larger than 20 MHz due to the allocation of the spectrum edges to PUCCH 902, 906.

One way for achieving a system that is configured in accordance with the LTE-Advanced standard is to concatenate LTE systems in the frequency domain. By concatenating LTE systems in the frequency domain, an LTE-Advanced system can use wide bandwidth as one system bandwidth and can achieve higher throughputs. However, the UE 304 cannot transmit uplink data in RBs which have been allocated to PUCCH 902, 906. This may cause a conflict between PUSCH 904 signals and the PUCCH 902, 906 signals of other UEs, especially if Format 1A's RB allocation includes RBs which are allocated to PUCCH 902, 906. In LTE-Advanced, the RBs for SC-FDMA are allocated consecutively but the spectrum allocation for LTE-Advanced UEs will be non-contiguous when the bandwidth is larger than 20 MHz.

One solution to this problem is to implement clustered SC-FDMA. In clustered SC-FDMA, the output of the DFT (discrete Fourier transform) is mapped to the input of the IFFT (inverse fast Fourier transform). In this UL access scheme, DFT output may be divided to several clusters and mapped to IFFT. The intervals of these clusters may be filled with zero input. In other words, the intervals of these clusters will be punctured. Clustered SC-FDMA will support non-contiguous frequency allocation by this mechanism.

Figure 10:
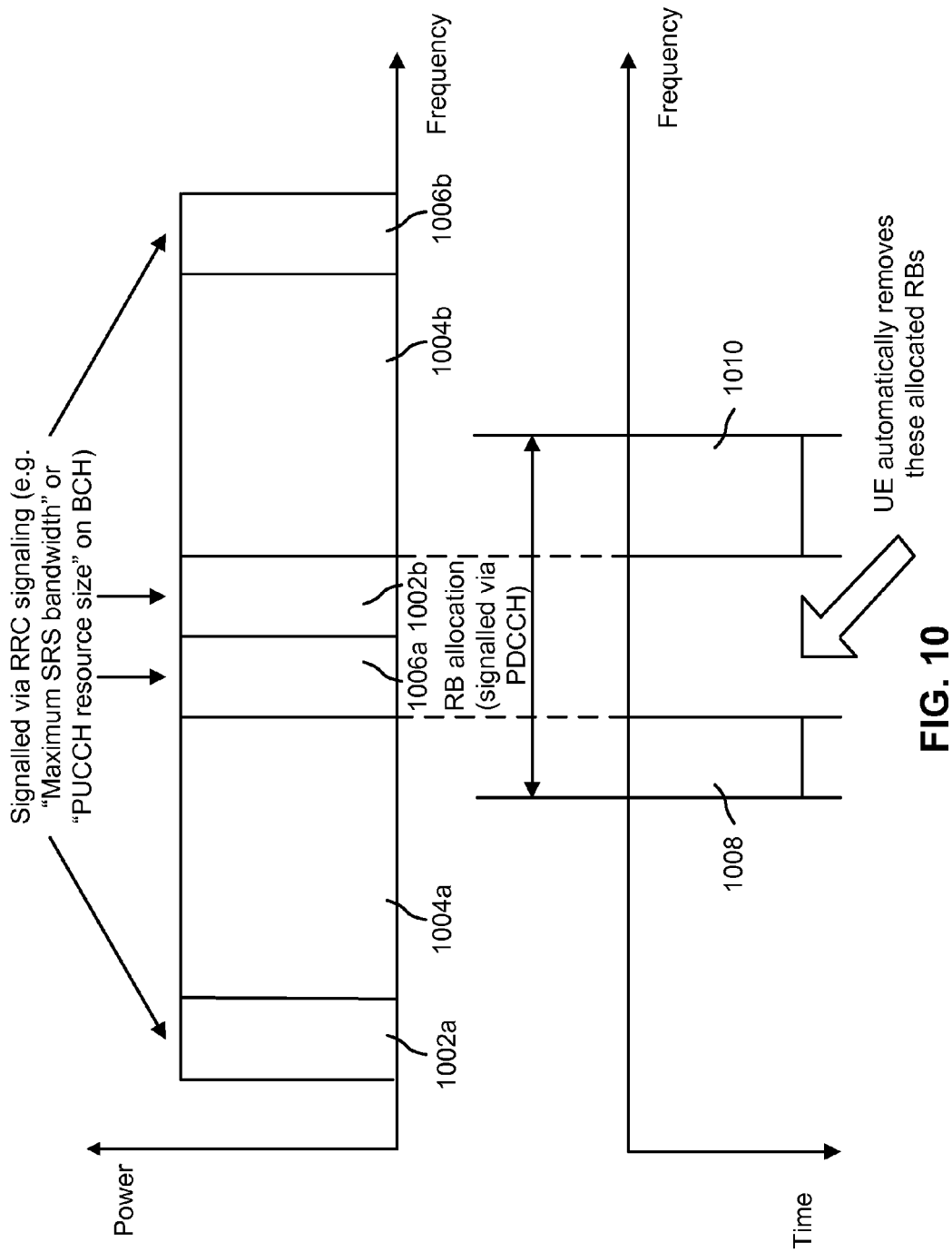
FIG. 10 illustrates the RB allocation of an LTE-Advanced uplink transmission.

FIG. 10 illustrates the RB allocation of an LTE-Advanced uplink transmission. This solution to the conflict between PUSCH signals and other UE's PUCCH signals is to puncture the RBs which are allocated to the PUCCH by using clustered SC-FDMA as described above. This means that no allocation is given to the input of the IFFT. Thus, in the RB allocation that is signaled via PDCCH, the UE 304 automatically removes the allocation for the PUCCH RBs 1002a, 1002b, 1006a, 1006b. In other words, the UE 304 will not send any signal on the PUCCH RBs 1002a, 1002b, 1006a, 1006b.

In order to avoid sending any signals on the PUCCH RBs 1002a, 1002b, 1006a, 1006b, the UE 304 may find out the exact RBs 1002a, 1002b, 1006a, 1006b which are allocated to the PUCCH. The UE 304 may use the "Maximum SRS bandwidth" and/or the "PUCCH resource size" to determine the exact RBs 1002a, 1002b, 1006a, 1006b which are allocated to the PUCCH. The UE 304 may receive the "Maximum SRS bandwidth" and the "PUCCH resource size" via RRC signaling on the broadcast channel (BCH). The UE 304 may then use the formats in Table 3, Table 4, and Table 5 to puncture the RBs 1002a, 1002b, 1006a, 1006b which are allocated to the PUCCH. Thus, the UE 304 may automatically remove the RBs 1002a, 1002b, 1006a, 1006b that are allocated to the PUCCH and only transmit the uplink on the remaining PUSCH RBs 1008, 1010.

Moreover, Format 1A and 1B in Table 3, 4 and 5 can be used to inform the wide RB allocation, e.g. RB allocation which is wider than 20 MHz or RB allocation which includes PUCCH RBs, by using this solution. Otherwise, non-contiguous RB allocation, e.g. Format 1 in Table 3, has to be used to inform the above wide RB allocation to avoid the conflicts with PUCCH RBs.

The clustered SC-FDMA solution may be used to avoid the conflict with PUCCH RBs as in the above. However, systems and methods may also use NxSC-FDMA or OFDMA instead of Clustered SC-FDMA.

Figure 11:
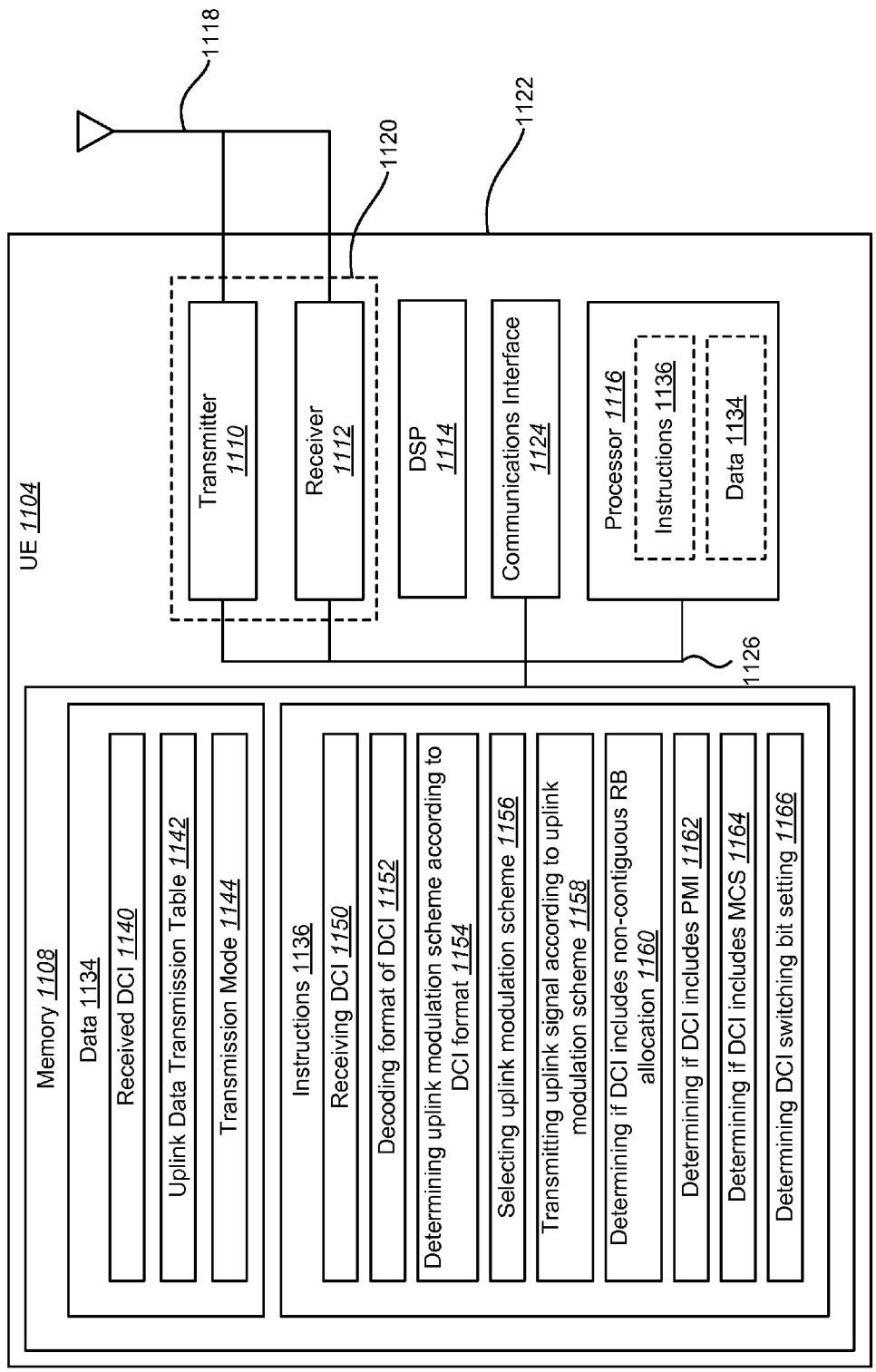
FIG. 11 is a block diagram of a UE in accordance with one configuration of the described systems and methods.

FIG. 11 is a block diagram of a UE 1104 in accordance with one configuration of the described systems and methods. The UE 1104 may also be referred to as a mobile station, a subscriber station, an access terminal, a remote station, etc. The UE 1104 may include a transceiver 1120 that includes a transmitter 1110 and a receiver 1112. The transceiver 1120 may be coupled to one or more antennas 1118. The UE 1104 may further include a digital signal processor (DSP) 1114, a general purpose processor 1116, memory 1108, and a communications interface 1124. The various components of the UE 1104 may be included within a housing 1122.

The processor 1116 may control operation of the UE 1104. The processor 1116 may also be referred to as a CPU. The memory 1108, which may include both read-only memory (ROM) and random access memory (RAM), provides instructions 1136 and data 1134 to the processor 1116. A portion of the memory 1108 may also include non-volatile random access memory (NVRAM). The memory 1108 may include any electronic component capable of storing electronic information, and may be embodied as ROM, RAM, magnetic disk storage media, optical storage media, flash memory, on-board memory included with the processor 1116, EPROM memory, EEPROM memory, registers, a hard disk, a removable disk, a CD-ROM, etc.

The memory 1108 may store program instructions 1136 and other types of data 1134. For example, the memory 1108 may store program instructions 1136 such as instructions 1150 for receiving a DCI 1140, and instructions 1152 for decoding the format of the received DCI 1140. The format of the DCI 1140 may depend on the transmission mode 1144. The program instructions 1136 may also include instructions 1154 for determining the uplink modulation scheme according to the DCI format. An uplink data transmission table 1142 may be configured to specify the uplink modulation scheme for the UE 1104 according to the format of the received DCI 1140. The program instructions 1136 may also include instructions 1156 for selecting an uplink modulation scheme, and instructions 1158 for transmitting the uplink signal according to the selected uplink modulation scheme. The program instructions 1136 may also include instructions 1160 for determining if the DCI 1140 includes a non-contiguous RB allocation, instructions 1162 for determining if the DCI 1140 includes a PMI, instructions 1164 for determining if the DCI 1140 includes an MCS, and instructions 1166 for determining the DCI switching bit setting.

Other types of instructions 1136 and data 1134 that are relevant to implementing the techniques described herein may also be included in the memory 1108.

The program instructions 1136 may be executed by the processor 1116 to implement some or all of the methods disclosed herein. The processor 1116 may also use the data 1134 stored in the memory 1108 to implement some or all of the methods disclosed herein. As a result, instructions 1136 and data 1134 may be loaded and/or otherwise used by the processor 1116.

In accordance with the disclosed systems and methods, the antenna 1118 may receive downlink signals that have been transmitted from a nearby communications device, such as a Node B 102. The antenna 1118 provides these received signals to the transceiver 1120 which filters and amplifies the signals. The signals are provided from the transceiver 1120 to the DSP 1114 and to the general purpose processor 1116 for demodulation, decoding, further filtering, etc.

The various components of the UE 1104 are coupled together by a bus system 1126 which may include a power bus, a control signal bus, and a status signal bus in addition to a data bus. However, for the sake of clarity, the various busses are illustrated in FIG. 11 as the bus system 1126.

Figure 12:
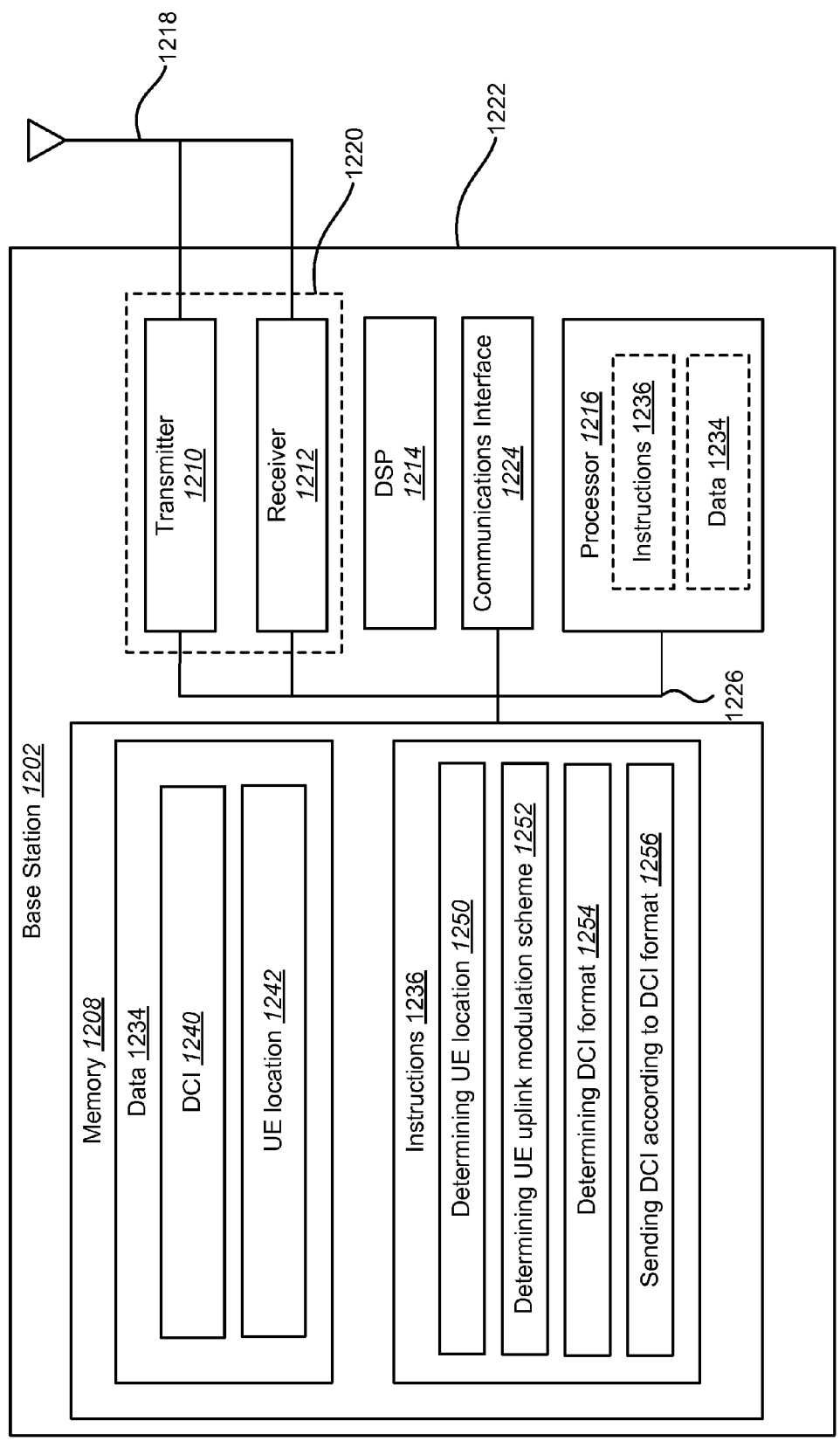
FIG. 12 is a block diagram of a base station in accordance with one configuration of the described systems and methods.

FIG. 12 is a block diagram of a base station 1202 in accordance with one configuration of the described systems and methods. The base station 1202 may also be referred to as a node B (NB), a base station controller, a base station transceiver, etc.

The base station 1202 includes many components that are similar to the components of the UE 1104 of FIG. 11, including a processor 1216, memory 1208 storing both data 1234 and instructions 1236, a transceiver 1220 including a transmitter 1210 and a receiver 1212, an antenna 1218, a system bus 1226, a DSP 1214, a communications interface 1224, and a housing 1222.

The memory 1208 may store instructions 1250 for determining the UE location 1242, instructions 1252 for determining the UE uplink modulation scheme to be used, instructions 1254 for determining the DCI format that corresponds to the UE uplink modulation scheme, and instructions 1256 for sending the DCI 1240 to the UE according to the DCI format.

Other types of instructions 1236 and data 1234 that are relevant to implementing the techniques described herein may also be included in the memory 1208.

In accordance with the disclosed systems and methods, the antenna 1218 may receive uplink signals that have been transmitted from a nearby communications device, such as a UE 1104. The antenna 1218 provides these received signals to the transceiver 1220 which filters and amplifies the signals. The signals are provided from the transceiver 1220 to the DSP 1214 and to the general purpose processor 1216 for demodulation, decoding, further filtering, etc.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure. For example, a reference to "base station 1202" refers to the specific base station that is shown in FIG. 12. However, the use of "base station" without a reference number refers to any base station that is appropriate for the context in which the term is used, and is not limited to any particular base station shown in the Figures.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements. The terms "instructions" and "code" may be used interchangeably herein.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for selection of an uplink modulation scheme, the method being implemented by base station, the method comprising:
   determining an uplink modulation scheme to be used by a user equipment (UE);
   transmitting, to the UE, a downlink control information (DCI) including a switching bit which indicates either an uplink modulation scheme called single carrier frequency division multiple access (SC-FDMA) or another scheme called clustered SC-FDMA.

2. The method in claim 1, wherein the transmitted DCI includes precoding matrix index (PMI) information.

3. The method in claim 1, wherein the transmitted DCI includes only one modulation and coding scheme (MCS) information.

4. A base station that is configured for selecting an uplink modulation scheme, the base station comprising:
   a processor;
   memory in electronic communication with the processor;
   instructions stored in the memory, the instructions being executable to:
      determine an uplink modulation scheme to be used by a user equipment (UE); and
      transmit, to the UE, a downlink control information (DCI) including a switching bit which indicates either an uplink modulation scheme called single carrier frequency division multiple access (SC-FDMA) or another scheme called clustered SC-FDMA.

5. The base station in claim 4, wherein the transmitted DCI includes precoding matrix index (PMI) information.

6. The base station in claim 4, wherein the transmitted DCI includes only one modulation and coding scheme (MCS) information.

7. A processor that is configured for selecting an uplink modulation scheme, the processor being included in base station, the processor comprising:
   memory;
   instructions stored in the memory, the instructions being executable to:
      determine an uplink modulation scheme to be used by a user equipment (UE); and
      transmit, to the UE, a downlink control information (DCI) including a switching bit which indicates either an uplink modulation scheme called single carrier frequency division multiple access (SC-FDMA) or another scheme called clustered SC-FDMA.

8. The processor in claim 7, wherein the transmitted DCI includes precoding matrix index (PMI) information.

9. The processor in claim 7, wherein the transmitted DCI includes only one modulation and coding scheme (MCS) information.

* * * * *